(12) United States Patent
Cao

(10) Patent No.: US 11,537,770 B2
(45) Date of Patent: Dec. 27, 2022

(54) QUANTUM CIRCUIT EMBEDDING BY SIMULATED ANNEALING

(71) Applicant: President and Fellows of Harvard College, Cambridge, MA (US)

(72) Inventor: Yudong Cao, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 154 days.

(21) Appl. No.: 17/179,975

(22) Filed: Feb. 19, 2021

(65) Prior Publication Data
US 2021/0173988 A1 Jun. 10, 2021

Related U.S. Application Data

(63) Continuation of application No. PCT/US2019/047241, filed on Aug. 20, 2019.
(Continued)

(51) Int. Cl.
*G06N 10/00* (2022.01)
*G06F 30/327* (2020.01)
*G06F 111/06* (2020.01)

(52) U.S. Cl.
CPC .......... *G06F 30/327* (2020.01); *G06N 10/00* (2019.01); *G06F 2111/06* (2020.01)

(58) Field of Classification Search
CPC .... G06F 30/327; G06F 2111/06; G06N 10/00
See application file for complete search history.

(56) References Cited

U.S. PATENT DOCUMENTS 9,875,215 B2 * 1/2018 Macready ............... G06N 5/003
2011/0231462 A1 * 9/2011 Macready ............... B82Y 10/00
708/231

FOREIGN PATENT DOCUMENTS

| WO | WO-2015/103375 A1 | 7/2015 |
| WO | WO-2018/089792 A1 | 5/2018 |
| WO | WO-2020/041295 A1 | 2/2020 |

OTHER PUBLICATIONS

Finigan et al., "Qubit Allocation for Noisy Intermediate-Scale Quantum Computers," Arxiv 1-6 (2018).
(Continued)

*Primary Examiner* — Nghia M Doan
(74) *Attorney, Agent, or Firm* — Alexander Akhiezer; Erik A. Huestis; Foley Hoag LLP

(57) ABSTRACT

Mapping of logical qubits to physical qubits is provided. In various embodiments, a first candidate subgraph is selected from a hardware graph. The hardware graph represents a physical quantum circuit. The hardware graph comprises a plurality of nodes corresponding to physical qubits and a plurality of edges corresponding to coupling among the plurality of qubits. An accepted subgraph is determined by: setting the accepted subgraph to be the first candidate subgraph; mapping a quantum circuit comprising a plurality of logical qubits to the accepted subgraph; generating a second candidate subgraph of the hardware graph based on the accepted subgraph; mapping the quantum circuit to the second candidate subgraph; comparing fidelities of the accepted subgraph and the second candidate subgraph for the quantum circuit; if the fidelity of the second candidate subgraph is greater than the fidelity of the accepted subgraph, setting the accepted subgraph to be the second candidate subgraph; if the fidelity of the second candidate subgraph is less than or equal to the fidelity of the accepted subgraph, setting the accepted subgraph to be the second candidate subgraph with a time-dependent probability.

18 Claims, 3 Drawing Sheets

Related U.S. Application Data

(60) Provisional application No. 62/720,633, filed on Aug. 21, 2018.

(56) References Cited

OTHER PUBLICATIONS

International Search Report and Written Opinion for International Application No. PCT/US2019/047241 dated Aug. 11, 2019.
Johnson et al., "QVector: an algorithm for device-tailored quantum error correction," Arxiv 1-16(2017).
Speakman et al., "Scalable Detection of Anomalous Patterns With Connectivity Constraints," J Compt Graph Stat 24(4):1014-1033 (2015).
Yudong Cao: "GitHub—yudongcao/QubitAllocation at dc444496dbf870583d49e498d8db8a09b7b3432e," (2018).
Zhou et al., "Technical Report: Graph-Structured Sparse Optimization for Connected Subgraph Detection," Arxiv (2016).

* cited by examiner

QUANTUM CIRCUIT EMBEDDING BY SIMULATED ANNEALING

CROSS-REFERENCE TO RELATED APPLICATIONS

This application is a continuation of International Application No. PCT/US2019/047241, filed Aug. 20, 2019, which claims the benefit of U.S. Provisional Application No. 62/720,633, filed Aug. 21, 2018, each of which is hereby incorporated by reference in its entirety.

BACKGROUND

Embodiments of the present disclosure relate to mapping logical qubits to physical qubits, and more specifically, to quantum circuit embedding by simulated annealing.

BRIEF SUMMARY

According to embodiments of the present disclosure, methods of and computer program products for mapping logical qubits to physical qubits are provided. In various embodiments, a first candidate subgraph is selected from a hardware graph. The hardware graph represents a physical quantum circuit. The hardware graph comprises a plurality of nodes corresponding to physical qubits and a plurality of edges corresponding to coupling among the plurality of qubits. An accepted subgraph is determined by: setting the accepted subgraph to be the first candidate subgraph; mapping a quantum circuit comprising a plurality of logical qubits to the accepted subgraph; generating a second candidate subgraph of the hardware graph based on the accepted subgraph; mapping the quantum circuit to the second candidate subgraph; comparing fidelities of the accepted subgraph and the second candidate subgraph for the quantum circuit; if the fidelity of the second candidate subgraph is greater than the fidelity of the accepted subgraph, setting the accepted subgraph to be the second candidate subgraph; if the fidelity of the second candidate subgraph is less than or equal to the fidelity of the accepted subgraph, setting the accepted subgraph to be the second candidate subgraph with a time-dependent probability.

In some embodiments, selecting the first candidate subgraph comprises selecting a random node of the hardware graph, and performing a depth-first search therefrom.

In some embodiments, generating the second candidate subgraph from the accepted subgraph comprises selecting a random node of the first candidate subgraph, and performing a depth-first search on the hardware graph therefrom. In some embodiments, generating the second candidate subgraph from the accepted subgraph comprises reversing the placement of at least two of the logical qubits in the accepted subgraph. In some embodiments, generating the second candidate subgraph from the accepted subgraph comprises randomly performing one of: i) selecting a random node of the accepted subgraph, and performing a depth-first search on the hardware graph therefrom; or ii) reversing the placement of at least two nodes in the accepted subgraph.

In some embodiments, the time-dependent probability is monotonically decreasing.

In some embodiments, determining an accepted subgraph further comprises repeatedly: generating an additional candidate subgraph of the hardware graph based on the accepted subgraph; mapping the quantum circuit to the additional candidate subgraph; comparing fidelities of the accepted subgraph and the additional candidate subgraph for the quantum circuit; if the fidelity of the second candidate subgraph is greater than the fidelity of the accepted subgraph, setting the accepted subgraph to be the second candidate subgraph; if the fidelity of the second candidate subgraph is less than or equal to the fidelity of the accepted subgraph, setting the accepted subgraph to be the second candidate subgraph with a time-dependent probability.

In some embodiments, generating the additional candidate subgraph based on the accepted subgraph comprises randomly performing one of: i) selecting a random node of the accepted subgraph, and performing a depth-first search on the hardware graph therefrom; or ii) reversing the placement of at least two nodes in the accepted subgraph.

In some embodiments, determining an accepted subgraph further comprises: ceasing said repetition after a predetermined number of cycles.

DETAILED DESCRIPTION

Figure 1:
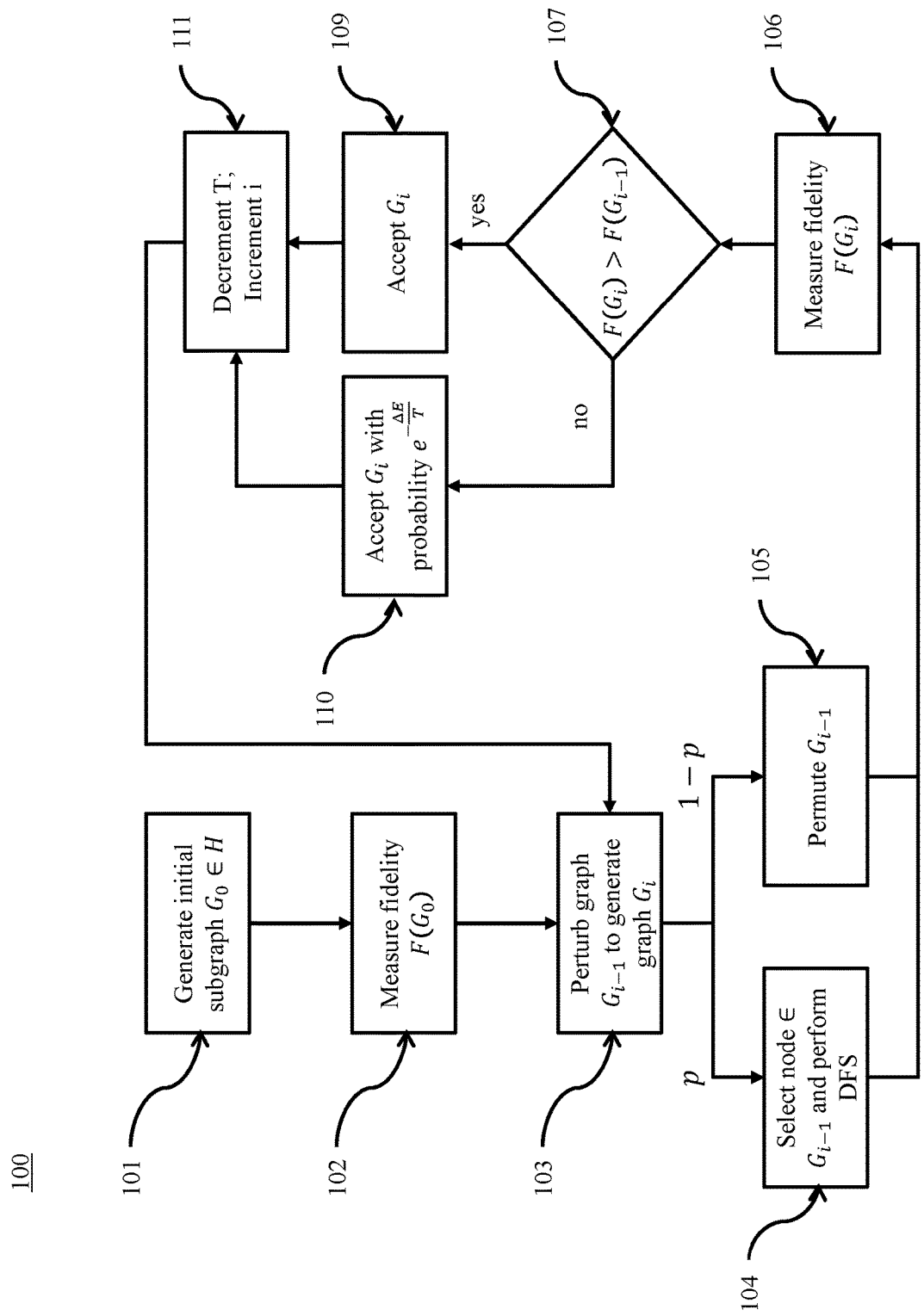
FIG. 1 is a flowchart illustrating a method for mapping logical qubits to physical qubits according to the present disclosure.

In order to execute a given quantum circuit on quantum hardware, a mapping must be determined from the logical qubits of the circuit definition to physical qubits. In general, a circuit definition includes a plurality of logical qubits and the operations on those qubits. The logical qubits must be allocated among the physical qubits, which are connected in a particular interaction graph, in a manner that allows execution of the defined circuit. Accordingly, a mapping of logical qubits in a quantum circuit to physical qubits embodied in hardware comprises a one-to-one (or injective) mapping from the logical domain to the physical domain that never maps distinct logical qubits to the same physical qubit, but may not account for all physical qubits.

This allocation forms the final stage of compiling a quantum circuit to hardware instructions. However, it is computationally NP-hard to find a high quality allocation. In order to allocate n abstract qubits on a hardware of m physical qubits, the total number of possible allocation grows exponentially as m grows, rendering exhaustive search impractical for even moderately sized instances. In addition, qubit connectivity and fidelities vary from hardware to hardware, rendering efficient, general methods for finding provably optimal allocation for an arbitrary quantum circuit unlikely.

To address these and other challenges, the present disclosure provides for quantum circuit embedding by simulated annealing.

As used herein, a quantum gate (or quantum logic gate) is a basic quantum circuit operating on a small number of qubits. By analogy to classical computing, quantum gates form quantum circuits, like classical logic gates form conventional digital circuits. Quantum logic gates are represented by unitary matrices. Various common quantum gates operate on spaces of one or two qubits, like classical logic gates operate on one or two bits. As matrices, quantum gates can be described by $2^n \times 2^n$ sized unitary matrices, where n is the number of qubits. The variables that the gates act upon, the quantum states, are vectors in $2^n$ complex dimensions. The base vectors indicate the possible outcomes if measured, and a quantum state is a linear combinations of these outcomes. The action of the gate on a specific quantum state is found by multiplying the vector which represents the state by the matrix representing the gate. Accordingly, a given quantum state may be prepared on a quantum circuit through application of a plurality of gates. A given state may be characterized as a distribution function that provides a distribution describing a continuous random variable.

Various physical embodiments of a quantum computer are suitable for use according to the present disclosure. In general, the fundamental data storage unit in quantum computing is the quantum bit, or qubit. The qubit is a quantum-computing analog of a classical digital-computer-system bit. A classical bit is considered to occupy, at any given point in time, one of two possible states corresponding to the binary digits 0 or 1. By contrast, a qubit is implemented in hardware by a physical component with quantum-mechanical characteristics. Each unit has an infinite number of different potential quantum-mechanical states. When the state of a qubit is physically measured, the measurement produces one of two different basis states. Thus, a single qubit can represent a one, a zero, or any quantum superposition of those two qubit states; a pair of qubits can be in any quantum superposition of 4 states; and three qubits in any superposition of 8 states. While qubits are characterized herein as mathematical objects, each corresponds to a physical qubit that can be implemented using a number of different physical implementations, such as trapped ions, optical cavities, individual elementary particles, molecules, or aggregations of molecules that exhibit qubit behavior.

In some embodiments, a quantum circuit comprises nonlinear optical media. In some embodiments, a quantum circuit comprises a cavity quantum electrodynamics device. In some embodiments, a quantum circuit comprises an ion trap. In some embodiments, a quantum circuit comprises a nuclear magnetic resonance device. In some embodiments, a quantum circuit comprises a superconducting device. In some embodiments, a quantum circuit comprises a solid state device.

In contrast to classical gates, there are an infinite number of possible single-qubit quantum gates that change the state vector of a qubit. Changing the state of a qubit state vector is therefore referred to as a rotation. A rotation, state change, or single-qubit quantum-gate operation may be represented mathematically by a unitary 2×2 matrix with complex elements.

A quantum circuit can be specified as a sequence of quantum gates. To conceptualize a quantum circuit, the matrices corresponding to the component quantum gates may be multiplied together in the order specified by the symbol sequence to produce a 2×2 complex matrix representing the same overall state change. A quantum circuit may thus be expressed as a single resultant operator. However, designing a quantum circuit in terms of constituent gates allows the design to conform to standard sets of gates, and thus enable greater ease of deployment. A quantum circuit thus corresponds to a design for a physical circuit in a quantum computer.

The problem of finding the optimal qubit allocation may be addressed as a discrete optimization problem. A useful and practical paradigm in addressing such problems is simulated annealing (SA). Simulated annealing is a probabilistic technique for approximating the global optimum of a given function. Specifically, it is a metaheuristic to approximate global optimization in a large search space. SA works by iteratively evolving a candidate solution by probabilistic steps.

Given the problem of minimizing a function E(x), where x is a discrete object in some domain, at each step the current candidate solution x is perturbed to a new candidate x'. If E(x') G E(x), the candidate is accepted. Otherwise, the candidate is accepted with probability $$e^{-\frac{\Delta E}{T}},$$

where $\Delta E = |E(x')-E(x)|$. T is an effective temperature parameter that regulates the probability of accepting a worse candidate. As the iterations proceed, the temperature will gradually drop, creating a simulated annealing process. As T→0, the probability of transition decreases to 0, at which point only function-minimizing steps are accepted.

In various embodiments, multiple batches of candidates are maintained and updated in parallel. By performing such parallel tempering, the efficiency of the SA approach is increased.

In various embodiments, the above described SA framework is applied to qubit allocation. The qubit allocation problem may be framed as a search on a hardware graph H of m physically connected qubits for a subgraph G of n qubits having maximized fidelity, wherein n G m. In hardware graph H, edges correspond to native coupling among physical qubits. For a given quantum circuit of n qubits and a particular choice of n-qubit subgraph G on the hardware, it is assumed that there is an efficient method for evaluating the fidelity F(G). SA is them applied to maximize F(G) for a given quantum circuit. The search may be further limited to connected subgraphs, as connected subgraphs will very likely outperform disconnected graphs for realizing a given quantum circuit.

In various embodiments, a policy is provided for perturbing the candidate solutions such that starting from any connected subgraph, any other connected subgraph on the hardware can be generated with non-zero probability (given infinite iterations). When applied in SA, the policy thus leads to an ergodic random walk in the entire space of connected subgraphs.

In various embodiments, the following perturbation scheme is applied. For an initial connected subgraph $G_0$, with probability p, a random node on $G_0$ is chosen and a depth-first search of n steps is performed. In this way a new connected subgraph $G_1$ is generated. With probability 1−p, the mapping for $G_0$ is permuted by randomly choosing a pair of abstract qubits and exchanging their assignments of physical qubits on the hardware.

Here p is a parameter determining the preference between permuting existing candidate or exploring a new subgraph. If p>0, with an infinite number of steps, every possible mapping from abstract qubits to the hardware qubits can be reached from any starting mapping (assuming that the hardware graph is connected).

The other aspects of the SA optimization such as the scheme for dropping the temperature are largely problem specific and will need some ad hoc fine tuning. The above perturbation scheme can also be used in the parallel tampering variant of SA.

With reference now to FIG. 1, a method for mapping logical qubits to physical qubits is illustrated according to embodiments of the present disclosure.

At 101, an initial subgraph $G_0$ of hardware graph H is generated. Subgraph $G_0$ has size n. Hardware graph H has size m, where n≤m. In some embodiments, the subgraph is generated by selecting a random node from H, and then performing a depth-first search of H for n steps, yielding a connected subgraph of size n. However, it will be appreciated that alternative initialization steps may be used to arrive at subgraph $G_0$, such as randomly selecting from a set of predetermined subgraphs. At each step of the depth-first search, the node being added to the subgraph is also mapped to a logical qubit.

For the purposes of this mapping, the logical qubits are placed in an order that does not change during the depth-first search. In some embodiments, an initialization function is applied to order the logical qubits into an initial order. For example, the logical qubits may be placed in a random initial order. Thus, the mapping of logical to physical qubits is determined by the initial order of the logical qubits and the traversal order of the subgraph. The process of mapping may therefore be viewed as sequential assignment of the logical qubits to the physical qubits during the DFS.

At 102, the fidelity $F(G_0)$ of this initial subgraph $G_0$ is computed. The fidelity of the subgraph is a measure of the aggregate similarity between the subgraph and the logical quantum, circuit. More generally, fidelity in this context refers to a measure of the closeness of two quantum states. It expresses the probability that one state will pass a test to identify as the other. In some embodiments, an aggregate fidelity is computed by multiplying together the single-qubit and two-qubit fidelities that each gate of the quantum circuit acts on.

At 103, a prior graph $G_{i-1}$ is perturbed to generate a new candidate graph G. As set out above, in some embodiments, with probability p, a node in the prior graph is selected at 104, and a depth first search of H is performed from that node over n steps. In some embodiments, with probability 1−p, two nodes in prior graph $G_{i-1}$ are reversed at 105 with respect to the mapping of the logical qubits. This reversal may be understood as changing the places of the logical qubits within the mapping. For example, for logical qubits $l_1$ and $l_2$, and physical qubits $p_1$ and $p_2$, an initial mapping onto $G_{i-1}$ may be expressed as $l_1 \rightarrow p_1$ and $l_2 \rightarrow p_2$. The perturbed mapping may be expressed as $l_2 \rightarrow p_1$ and $l_1 \rightarrow p_2$.

At 106, the fidelity of the candidate graph $G_1$ is determined. At 107, the fidelity of the candidate graph is compared to the fidelity of the prior graph. If the fidelity is higher, the candidate graph is accepted at 109. If the fidelity is not higher, the candidate graph is accepted with a probability of $$e^{-\frac{\Delta E}{T}}.$$

At 111, the temperature value is decreased, and a new cycle is commenced at 103. The process is repeated until the temperature decreases below a certain value, or until a certain number of cycles are completed.

Figure 2:
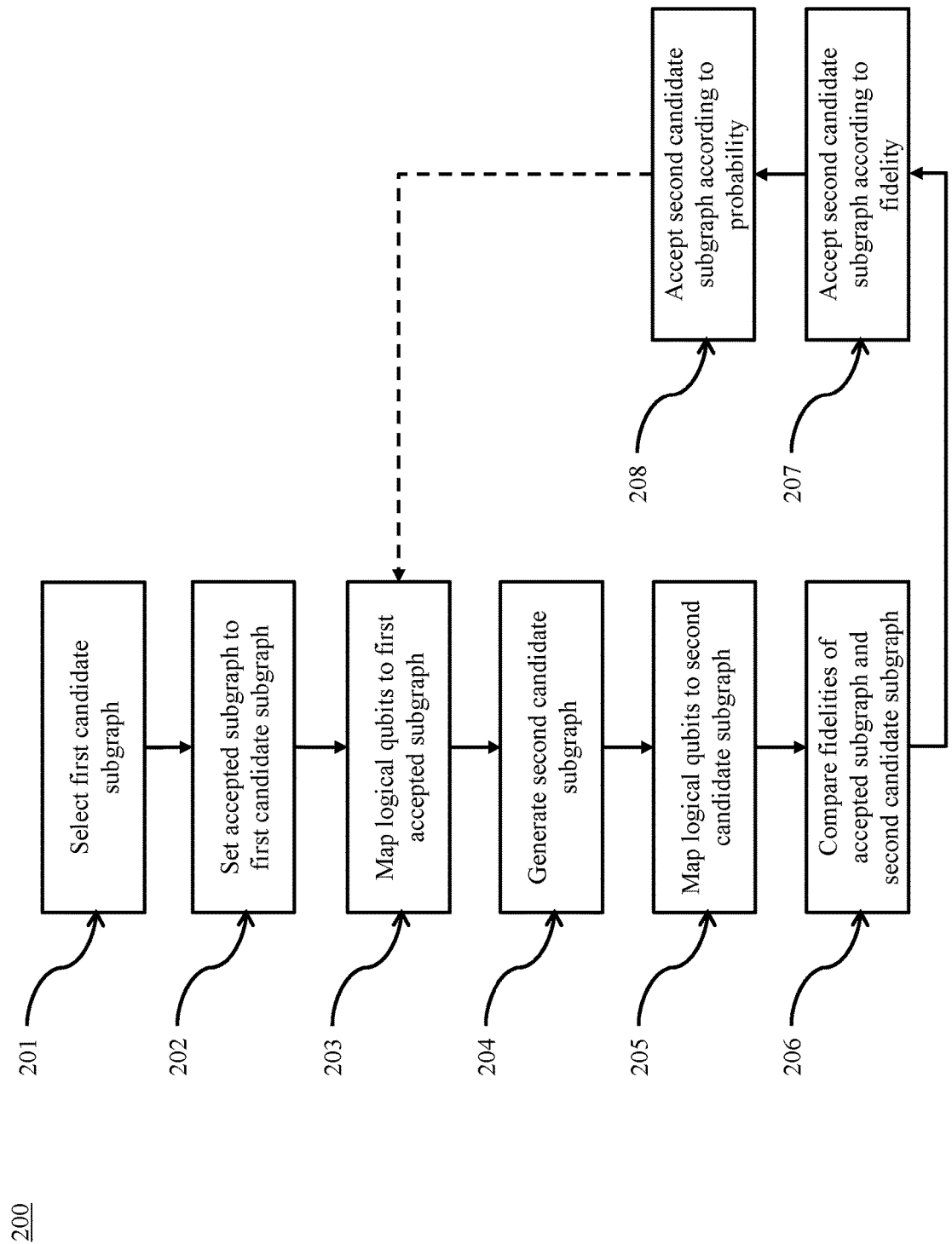
FIG. 2 is a flowchart illustrating a method for mapping logical qubits to physical qubits according to the present disclosure.

With reference now to FIG. 2, a method for mapping a quantum circuit to hardware is illustrated according to embodiments of the present disclosure. At 201, a first candidate subgraph is selected from a hardware graph. The hardware graph represents a physical quantum circuit. The hardware graph comprises a plurality of nodes corresponding to physical qubits and a plurality of edges corresponding to coupling among the plurality of qubits. An accepted subgraph is determined by: at 202, setting the accepted subgraph to be the first candidate subgraph; at 203, mapping a quantum circuit comprising a plurality of logical qubits to the accepted subgraph; at 204, generating a second candidate subgraph of the hardware graph based on the accepted subgraph; at 205, mapping the quantum circuit to the second candidate subgraph; at 206 comparing fidelities of the accepted subgraph and the second candidate subgraph for the quantum circuit; at 207, if the fidelity of the second candidate subgraph is greater than the fidelity of the accepted subgraph, setting the accepted subgraph to be the second candidate subgraph; at 208, if the fidelity of the second candidate subgraph is less than or equal to the fidelity of the accepted subgraph, setting the accepted subgraph to be the second candidate subgraph with a time-dependent probability.

Figure 3:
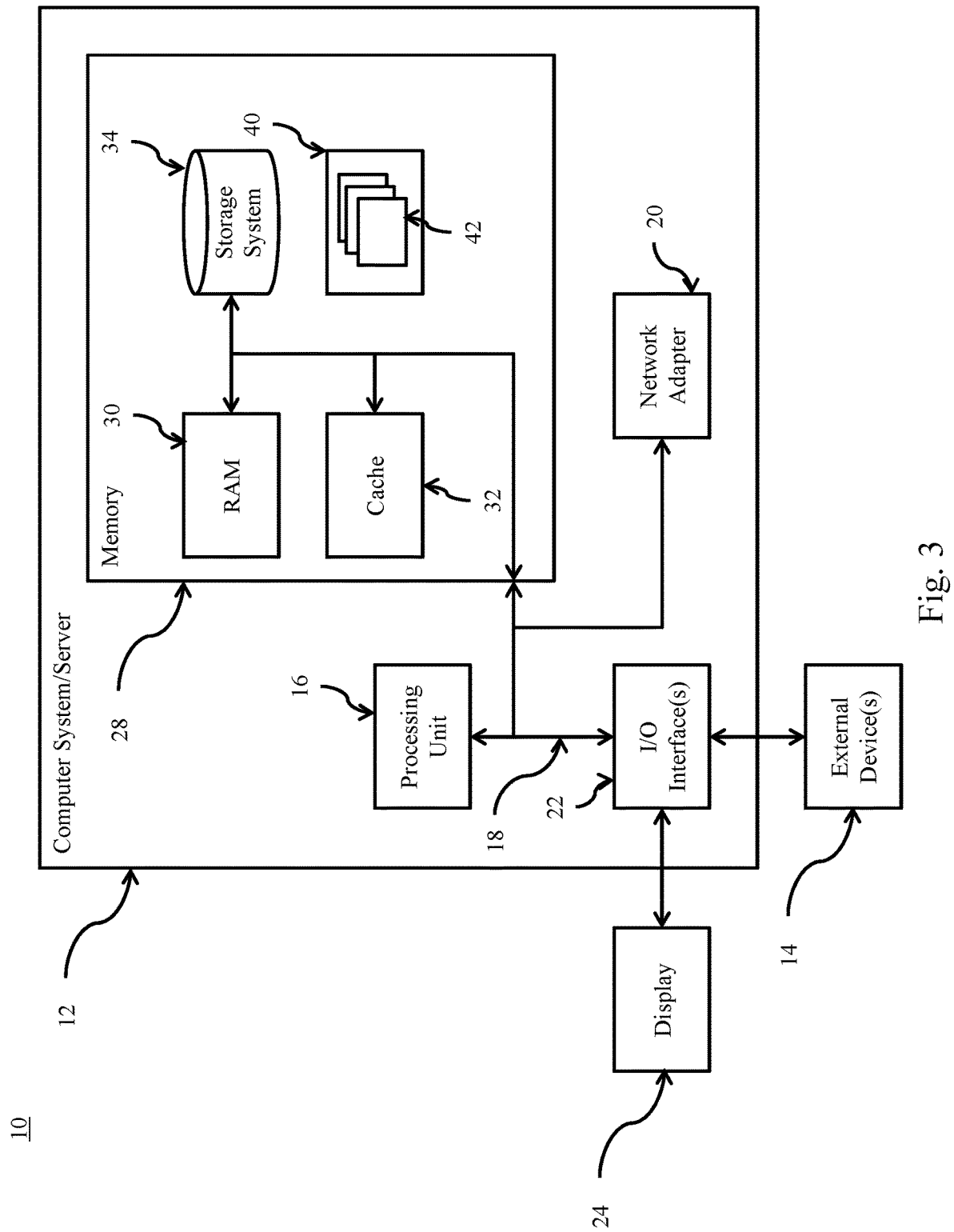
FIG. 3 depicts a computing node according to an embodiment of the present disclosure.

Referring now to FIG. 3, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of mapping a quantum circuit to hardware, the method comprising:
   selecting a first candidate subgraph of a hardware graph, the hardware graph representing a physical quantum circuit, the hardware graph comprising a plurality of nodes corresponding to physical qubits and a plurality of edges corresponding to coupling of the plurality of physical qubits;
   determining an accepted subgraph by:
      setting the accepted subgraph to be the first candidate subgraph;
      mapping a quantum circuit comprising a plurality of logical qubits to the accepted subgraph;
      generating a second candidate subgraph of the hardware graph based on the accepted subgraph;
      mapping the quantum circuit to the second candidate subgraph;
      comparing fidelities of the accepted subgraph and the second candidate subgraph for the quantum circuit;
      if the fidelity of the second candidate subgraph is greater than the fidelity of the accepted subgraph, setting the accepted subgraph to be the second candidate subgraph;
      if the fidelity of the second candidate subgraph is less than or equal to the fidelity of the accepted subgraph, setting the accepted subgraph to be the second candidate subgraph with a time-dependent probability.

2. The method of claim 1, wherein selecting the first candidate subgraph comprises selecting a random node of the hardware graph, and performing a depth-first search therefrom.

3. The method of claim 1, wherein generating the second candidate subgraph from the accepted subgraph comprises selecting a random node of the first candidate subgraph, and performing a depth-first search on the hardware graph therefrom.

4. The method of claim 1, wherein generating the second candidate subgraph from the accepted subgraph comprises reversing the placement of at least two of the logical qubits in the accepted subgraph.

5. The method of claim 1, wherein generating the second candidate subgraph from the accepted subgraph comprises randomly performing one of: i) selecting a random node of the accepted subgraph, and performing a depth-first search on the hardware graph therefrom; or ii) reversing the placement of at least two nodes in the accepted subgraph.

6. The method of claim 1, wherein the time-dependent probability is monotonically decreasing.

7. The method of claim 1, wherein determining an accepted subgraph further comprises repeatedly:
   generating an additional candidate subgraph of the hardware graph based on the accepted subgraph;
   mapping the quantum circuit to the additional candidate subgraph;
   comparing fidelities of the accepted subgraph and the additional candidate subgraph for the quantum circuit;
   if the fidelity of the second candidate subgraph is greater than the fidelity of the accepted subgraph, setting the accepted subgraph to be the second candidate subgraph;
   if the fidelity of the second candidate subgraph is less than or equal to the fidelity of the accepted subgraph, setting the accepted subgraph to be the second candidate subgraph with a time-dependent probability.

8. The method of claim 7, wherein generating the additional candidate subgraph based on the accepted subgraph comprises randomly performing one of: i) selecting a random node of the accepted subgraph, and performing a depth-first search on the hardware graph therefrom; or ii) reversing the placement of at least two nodes in the accepted subgraph.

9. The method of claim 7, wherein determining an accepted subgraph further comprises:
  ceasing said repetition after a predetermined number of cycles.

10. A computer program product for mapping a quantum circuit to hardware, the computer program product comprising a computer readable storage medium having program instructions embodied therewith, the program instructions executable by a processor to cause the processor to perform a method comprising:
  selecting a first candidate subgraph of a hardware graph, the hardware graph representing a physical quantum circuit, the hardware graph comprising a plurality of nodes corresponding to physical qubits and a plurality of edges corresponding to coupling of the plurality of physical qubits;
  determining an accepted subgraph by:
    setting the accepted subgraph to be the first candidate subgraph;
    mapping a quantum circuit comprising a plurality of logical qubits to the accepted subgraph;
    generating a second candidate subgraph of the hardware graph based on the accepted subgraph;
    mapping the quantum circuit to the second candidate subgraph;
    comparing fidelities of the accepted subgraph and the second candidate subgraph for the quantum circuit;
    if the fidelity of the second candidate subgraph is greater than the fidelity of the accepted subgraph, setting the accepted subgraph to be the second candidate subgraph;
    if the fidelity of the second candidate subgraph is less than or equal to the fidelity of the accepted subgraph, setting the accepted subgraph to be the second candidate subgraph with a time-dependent probability.

11. The computer program product of claim 10, wherein selecting the first candidate subgraph comprises selecting a random node of the hardware graph, and performing a depth-first search therefrom.

12. The computer program product of claim 10, wherein generating the second candidate subgraph from the accepted subgraph comprises selecting a random node of the first candidate subgraph, and performing a depth-first search on the hardware graph therefrom.

13. The computer program product of claim 10, wherein generating the second candidate subgraph from the accepted subgraph comprises reversing the placement of at least two of the logical qubits in the accepted subgraph.

14. The computer program product of claim 10, wherein generating the second candidate subgraph from the accepted subgraph comprises randomly performing one of: i) selecting a random node of the accepted subgraph, and performing a depth-first search on the hardware graph therefrom; or ii) reversing the placement of at least two nodes in the accepted subgraph.

15. The computer program product of claim 10, wherein the time-dependent probability is monotonically decreasing.

16. The computer program product of claim 10, wherein determining an accepted subgraph further comprises repeatedly:
  generating an additional candidate subgraph of the hardware graph based on the accepted subgraph;
  mapping the quantum circuit to the additional candidate subgraph;
  comparing fidelities of the accepted subgraph and the additional candidate subgraph for the quantum circuit;
  if the fidelity of the second candidate subgraph is greater than the fidelity of the accepted subgraph, setting the accepted subgraph to be the second candidate subgraph;
  if the fidelity of the second candidate subgraph is less than or equal to the fidelity of the accepted subgraph, setting the accepted subgraph to be the second candidate subgraph with a time-dependent probability.

17. The computer program product of claim 16, wherein generating the additional candidate subgraph based on the accepted subgraph comprises randomly performing one of: i) selecting a random node of the accepted subgraph, and performing a depth-first search on the hardware graph therefrom; or ii) reversing the placement of at least two nodes in the accepted subgraph.

18. The computer program product of claim 16, wherein determining an accepted subgraph further comprises:
  ceasing said repetition after a predetermined number of cycles.

* * * * *